Sept. 8, 1970  E. G. CLARK  3,527,471

HEAVY DUTY MULTIPLE AXLE VEHICLE

Original Filed Oct. 12, 1967  8 Sheets-Sheet 1

INVENTOR.
EDMUND G. CLARK
BY George C. Sullivan
Agent

Sept. 8, 1970          E. G. CLARK          3,527,471

HEAVY DUTY MULTIPLE AXLE VEHICLE

Original Filed Oct. 12, 1967          8 Sheets-Sheet 2

INVENTOR.
EDMUND G. CLARK
BY
*George C. Sullivan*
Agent

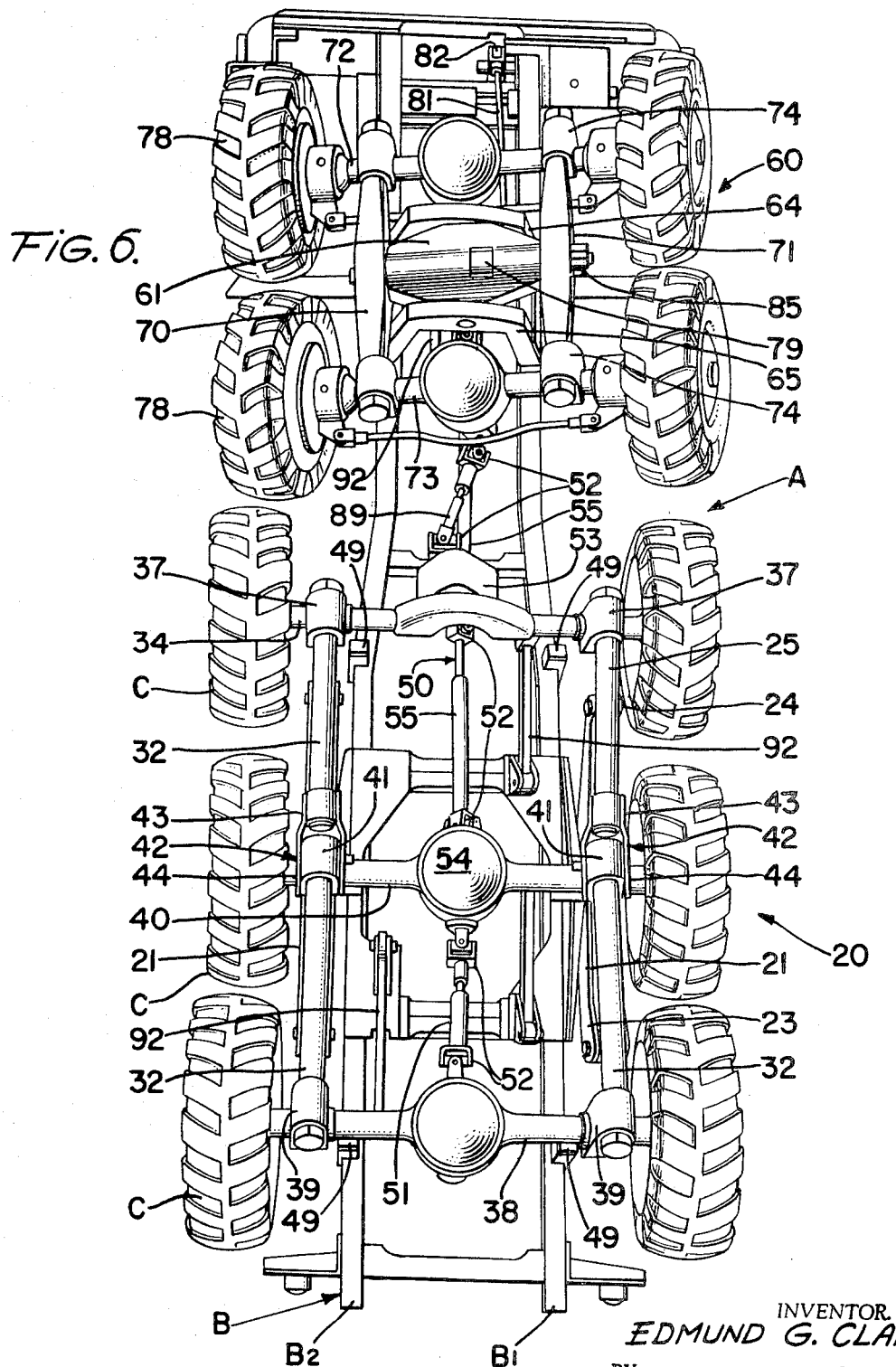
Sept. 8, 1970   E. G. CLARK   3,527,471
HEAVY DUTY MULTIPLE AXLE VEHICLE
Original Filed Oct. 12, 1967   8 Sheets-Sheet 5
INVENTOR.
EDMUND G. CLARK
BY George C. Sullivan
Agent Sept. 8, 1970 E. G. CLARK 3,527,471
HEAVY DUTY MULTIPLE AXLE VEHICLE
Original Filed Oct. 12, 1967 8 Sheets-Sheet 6
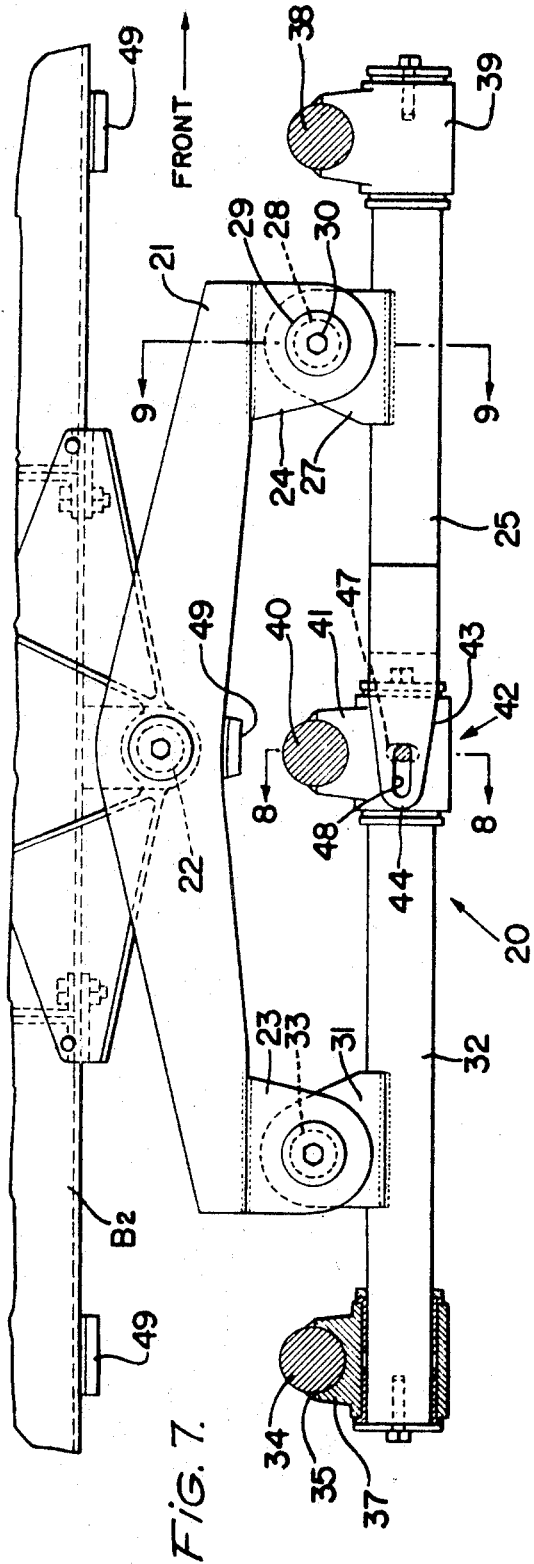
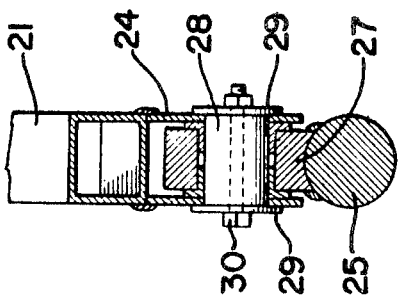
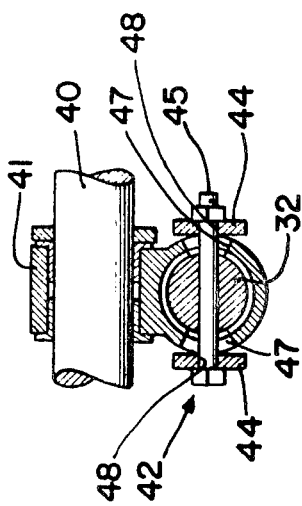
INVENTOR.
EDMUND G. CLARK
BY George C. Sullivan
Agent Sept. 8, 1970          E. G. CLARK          3,527,471
HEAVY DUTY MULTIPLE AXLE VEHICLE
Original Filed Oct. 12, 1967          8 Sheets-Sheet 7
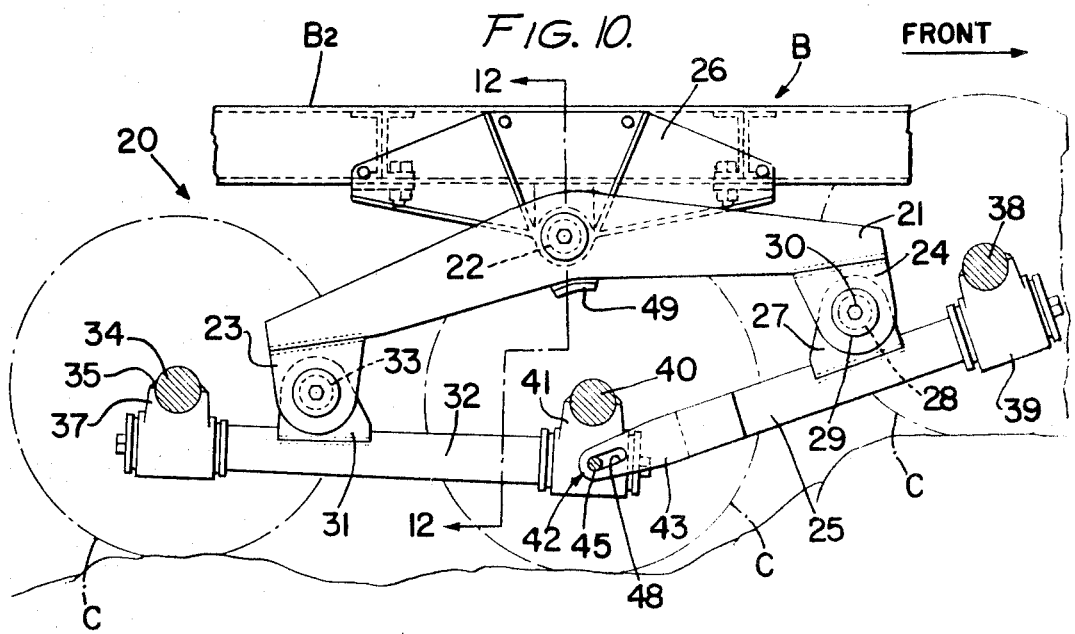
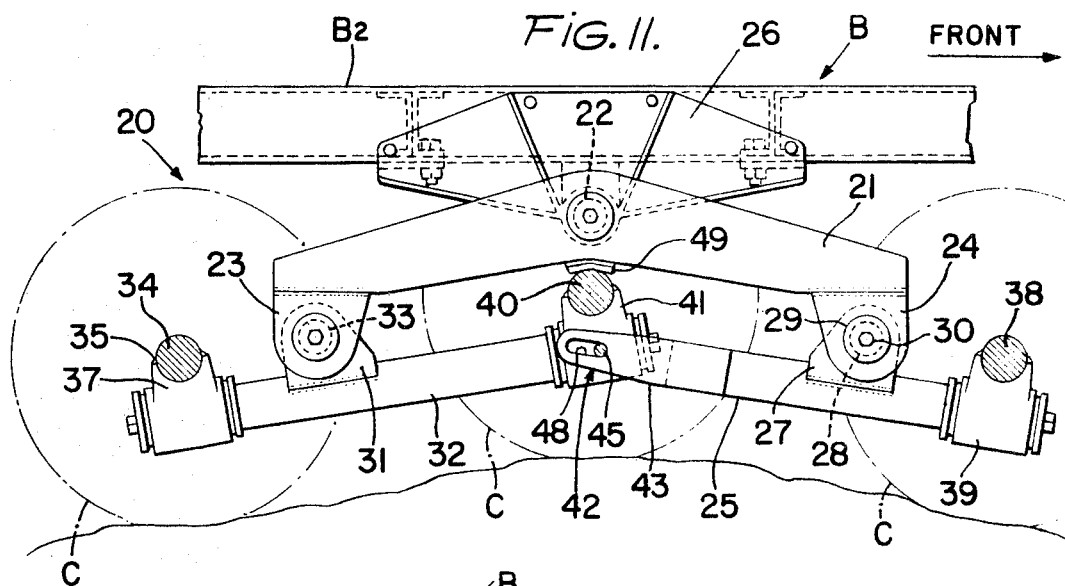
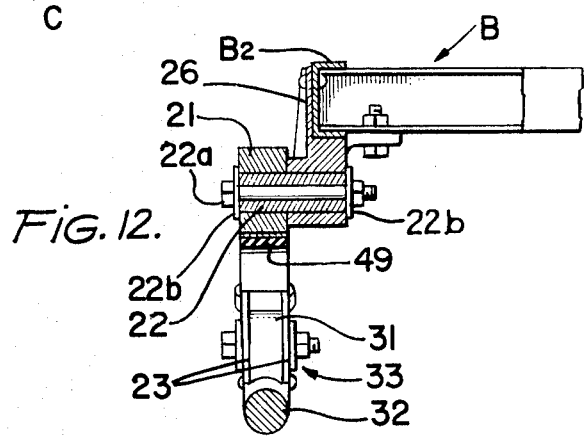
INVENTOR.
EDMUND G. CLARK
BY George C. Sullivan
Agent Sept. 8, 1970  E. G. CLARK  3,527,471
HEAVY DUTY MULTIPLE AXLE VEHICLE
Original Filed Oct. 12, 1967  8 Sheets-Sheet 8
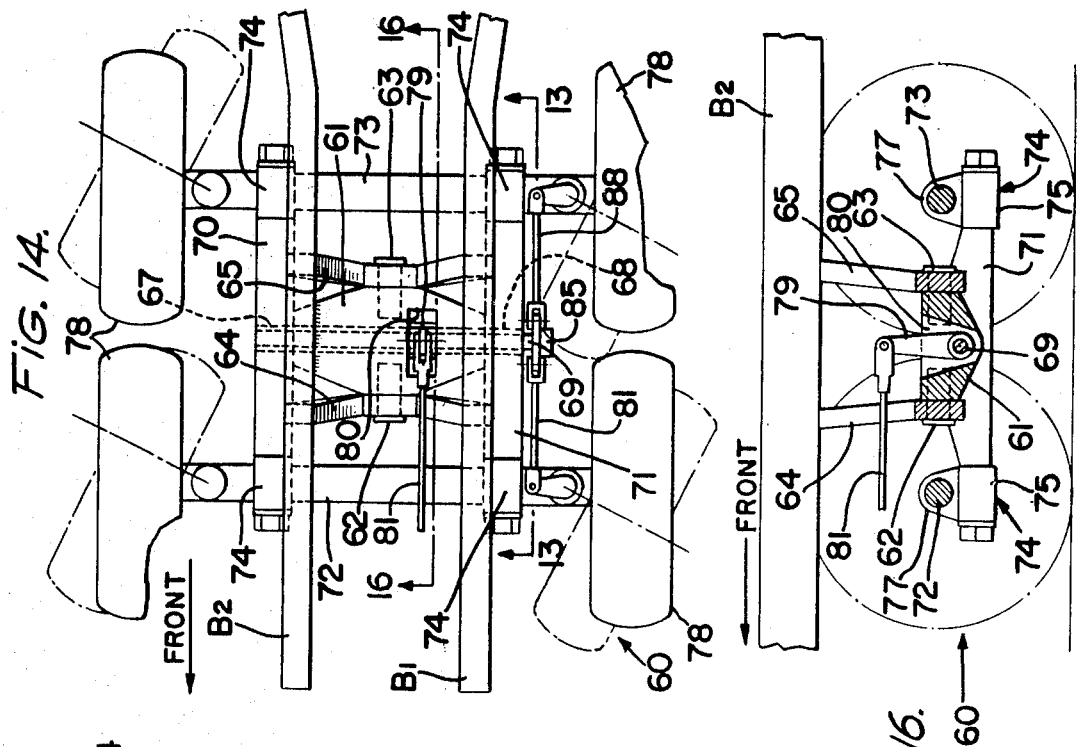
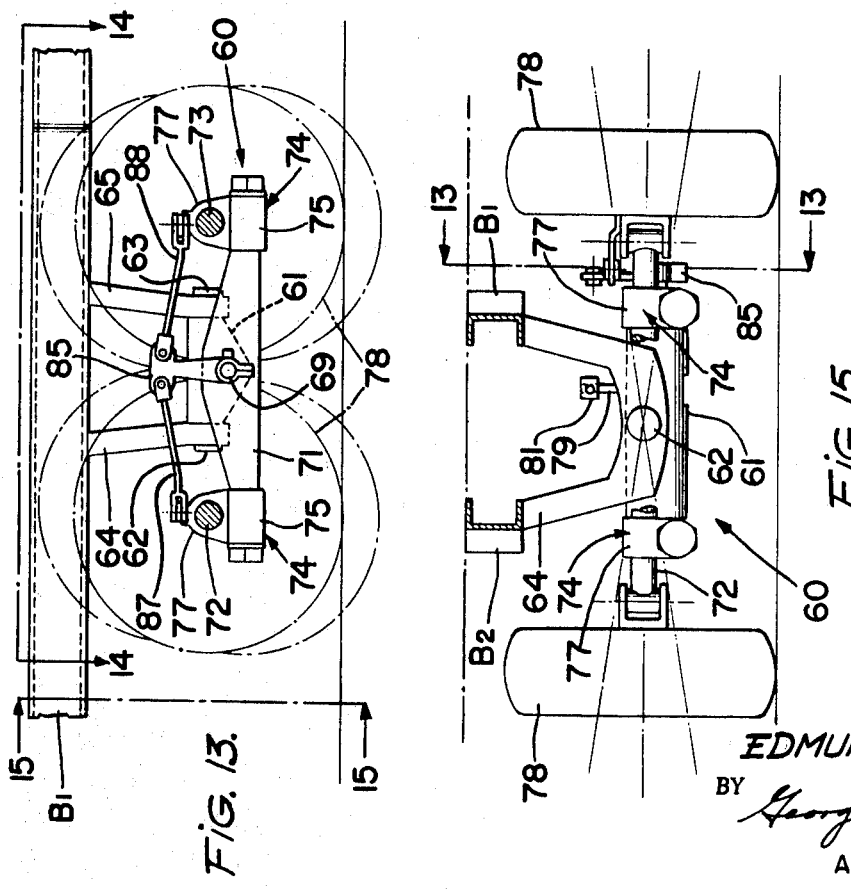
INVENTOR.
EDMUND G. CLARK
BY George C. Sullivan
Agent United States Patent Office 3,527,471
Patented Sept. 8, 1970

3,527,471
HEAVY DUTY MULTIPLE AXLE VEHICLE
Edmund G. Clark, Los Altos, Calif., assignor to Lockheed Aircraft Corporation, Burbank, Calif.
Original application Oct. 12, 1967, Ser. No. 674,949, now Patent No. 3,471,166, dated Oct. 7, 1969. Divided and this application Mar. 3, 1969, Ser. No. 816,866
Int. Cl. B62d 7/04
U.S. Cl. 280—81.5                    6 Claims

ABSTRACT OF THE DISCLOSURE

An off-the-highway, heavy duty vehicle having a rigid frame supported by a three-rear-axle suspension and a two-axle front quad or bogie, any or all of the axles of which may be either dead or live at the discretion of the designer of a particular vehicle embodying the invention, the wheels of the front quad being dirigible.

---

This is a division of patent application Ser. No. 674,949, filed Oct. 12, 1967, now Pat. No. 3,471,166.

The three-rear-axle suspension comprises a pair of primary walking beams fulcrumed, on opposite sides of the frame, on a common transverse axis. Each primary walking beam has a pair of secondary walking beams fulcrumed one beneath each end thereof, and interconnected by a sliding, pivotal connection. The three axles are mounted, one transversely across the front ends of the front secondary walking beams, one across the rear ends of the front secondary walking beams, and one across the rear ends of the rear secondary walking beams. The three rear axles are so spaced apart, relative to the fulcrums of the walking beams as to divide equally among the three axles the load imposed by the frame on the primary walking beams.

The front quad suspension comprises a pylon mounted beneath the front end of the vehicle frame, and a trunnion block trunnioned in the lower end of the pylon. A pair of walking beams are trunnioned on the trunnio pair of walking beams are trunnioned on the trunnion block, and the two front axles are mounted, one transversely across the front ends, and one transversely across the rear ends of the latter walking beams. This, in conjunction with the rear suspension of the preceding paragraph provides substantially a three-point suspension for the rigid truck frame.

Usual dirigible support wheels are mounted in a well-known manner, one on each end of each front axle.

Steering of the support wheels of the front quad is accomplished by an inboard steering arm mounted on a shaft journaled co-axially of the trunnion block, and at, or close to, the intersection of the axes of the trunnion block and the two walking beams trunnioned thereon. A usual drag link and associated mechanism operatively connects the free end of the inboard steering arm to a usual steering wheel, while conventional Ackerman links and levers connect an outboard steering arm, mounted on the outer end of the steering shaft, to the dirigible front wheels.

FIELD OF THE INVENTION

This invention relates in general to a multi-axle vehicle of great load carrying ability which is capable of operating over extremely rough terrain while maintaining all wheels substantially evenly loaded, without frame distortion, and with any selected one or ones of the axles live, i.e. power driven.

DESCRIPTION OF THE PRIOR ART

In large, heavy-duty vehicles it is desirable and customary to divide the load on the rear portion of the vehicle among a plurality of rear axles, and in some cases a plurality of front axles also. In such cases it is common practice to employ walking beams to support the axles in order to maintain the support wheels on the various axles in contact with the terrain over which the vehicle passes, and to attempt to equalize the load and driving and braking torque imposed on the various axles. While the development of such vehicles has been the subject of a great amount of inventive work and research, and many such vehicles have been developed which are satisfactory for operation on the highways and over somewhat rough terrain, most of these prior vehicles are not capable of operating satisfactorily under heavy load over really rough terrain such as that encountered in some types of military service and on construction sites.

OBJECTS OF THE INVENTION

The present invention has for one object to provide an improved vehicle having three rear axles which are capable of extreme vertical "walk" and transverse tilting displacement relative to the vehicle frame and to each other, any or all of which axles may be live.

Another object of the invention is to provide a three-rear-axle truck suspension, the three axles of which are mounted on a series of walking beams in a manner to permit the wheels of the various axles to conform to extremely rough terrain over which the vehicle is being driven, while at the same time transferring braking and driving torque and weight loading in a relatively even manner from all three of the axles to the vehicle frame.

Another object of the invention is to provide a heavy duty, off-the-highway type vehicle having a substantially rigid frame with an improved three-rear-axle suspension and a four wheel front bogie or quad, the latter being mounted for universal pitch and roll movement relative to the frame thereby providing, in effect, a three point suspension for the frame.

Another object of the invention is to provide an improved vehicle for operation over rough terrain wherein a three-rear-axle suspension has a primary walking beam fulcrumed medially of its length to extend lengthwise along each side of the vehicle frame, with a pair of secondary walking beams fulcrumed in substantial longitudinal alignment beneath each primary walking beam, the adjacent ends of the secondary walking beams on each side of the vehicle frame being interconnected by a sliding, hinged connection, one of the three rear axles being mounted transversely across the front ends of the front secondary walking beams, one across the rear ends of the rear secondary walking beams, and one adjacent the hingedly connected ends of the secondary walking beams, the three axles being so spaced apart as to divide operative stresses imposed thereon substantially equally among them.

Another object of the invention is to provide an improved four wheel front suspension for a heavy-duty, off-the-highway type vehicle having a rigid frame, the four wheels of which front suspension are steerable, and wherein the front suspension is free for universal pitch and roll and limited twisting movement relative to the vehicle frame.

The foregoing objects and advantages of the invention will be apparent from the following description and the accompanying drawings, wherein FIG. 1 is a view in perspective showing the right hand side of a vehicle embodying the invention, the body of the vehicle being omitted.

FIG. 6 is a bottom, perspective view of the same vehicle.

FIG. 7 is a fragmentary, vertical, longitudinal, sectional view taken just inside the wheels of the three-rear-axle suspension, the axles being dead.

FIG. 8 is an enlarged, fragmentary, sectional view taken along line 8—8 of FIG. 7.

FIG. 9 is a similarly enlarged, fragmentary, sectional view taken along line 9—9 of FIG. 7.

FIG. 10 is a fragmentary, sectional view taken similarly to FIG. 7 and showing the intermediate wheel displaced downwardly and the rear wheel displaced upwardly.

FIG. 11 is a view similar to FIG. 10, but with the intermediate wheel displaced upwardly.

FIG. 12 is a fragmentary, sectional view taken along line 12—12 of FIG. 10.

FIG. 13 is a sectional view of the front quad suspension and a fragment of the vehicle frame taken along line 13—13 of FIG. 14, the axles being dead, the dot-dash lines indicating pitch movement.

FIG. 14 is a sectional view taken along line 14—14 of FIG. 13, the dot-dash lines indicating steering movement of the wheels.

FIG. 15 is a sectional view taken along line 15—15 of FIG. 13, the dot-dash lines indicating roll movement of the trunnion block about its trunnion axis.

FIG. 16 is a sectional view taken along line 16—16 of FIG. 14.

DETAILED DESCRIPTION—REAR SUSPENSION

Figure 1:
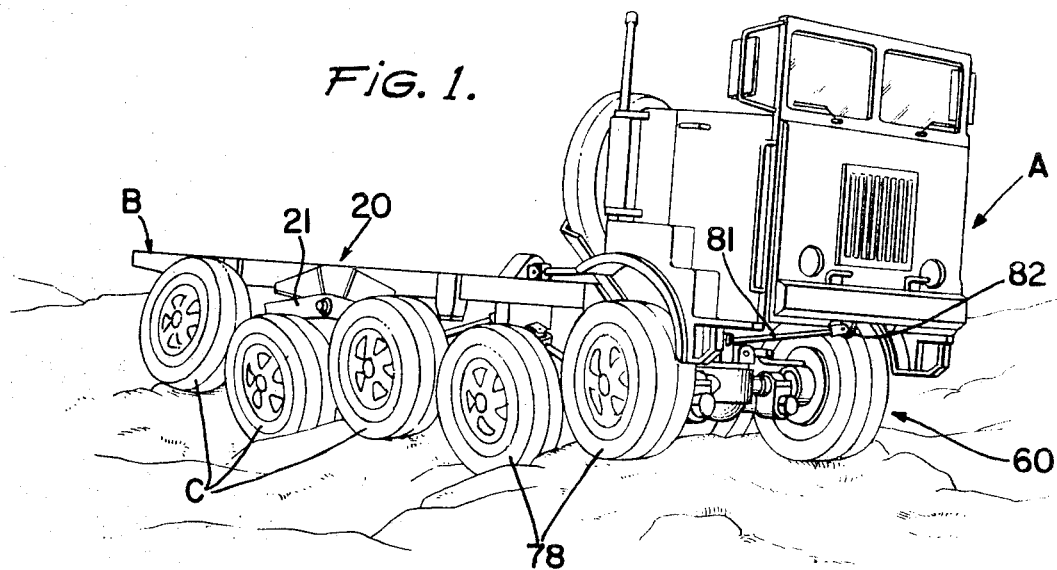

Referring to the drawings in detail, FIGS. 1-6 show the invention incorporated in a heavy-duty, truck type vehicle with the two front axles and two rear axles live, while FIGS. 7-16 show the same general suspension but with all axles dead. The illustrative vehicle A (FIGS. 1-6) has a three-rear-axle suspension 20 comprising a pair of primary walking beams 21 fulcrumed, substantially medially of their respective lengths, on a pair of co-axially mounted pins 22, which are press fitted into mounting plates 26 fixedly secured one on each side of the vehicle frame B as best shown in FIG. 12. The walking beam 21 is retained on its pin 22 by a through-bolt 22a and washers 22b.

Since the elements of the three-rear-axle suspension 20 are the same on both sides of the vehicle, corresponding parts on the two sides of the vehicle are designated by the same reference numerals. Also, the same reference numerals are used to designate corresponding parts throughout all of the views of the drawings, since the only significant difference between the structure of FIGS. 1-6 and that of FIGS. 7-16 is that in the latter figures the axles are dead.

A downwardly extending bracket 23 is provided on the rear end of each primary walking beam 21, and a similar bracket 24 is provided on the front end thereof. A front, secondary walking beam 25 has a boss 27 secured thereto approximately one-third of its length from its front end, and this boss is fitted (FIGS. 7, 9, 10 and 11) into the front bracket 24 and is fulcrumed thereon by a pivot pin 28. End disks 29 are held in place by a through-bolt 30 to anchor the pin 28 in position.

Suitable bearings may be provided, in accordance with standard practice, in all of the joints of the vehicle which are subject to relative rotative movement. Such bearings may be of types conventionally used in truck construction, and may be of metal, rubber or other suitable material. Since the provision of friction reducing bearings at all such points will be obvious to anyone familiar with motor truck construction or design, the details thereof are not illustrated or described herein.

A boss 31, similar to the boss 27 on the front secondary walking beam 25, is provided on each rear secondary walking beam 32 approximately one-third of the latter's length from its rear end, and this boss 31 is fitted into the bracket 23 on the rear end of the primary walking beam 21 and is fulcrumed thereon by a pivot pin assembly 33 similar to that for the front boss 27. The axes of the pins 28 and 33 are parallel to each other and to that of the pivot pins 22, and all three of the walking beams 21, 25 and 32 lie in substantially the same longitudinal upright plane when the vehicle A is on level terrain.

The rearmost axle 34 of the three-rear-axle suspension 20 is secured, as by welds 35, in a pair of saddle mounts 37 (FIGS. 6, 7, 10 and 11) one of which is journaled for relative rotative movement on the rear end portion of each rear secondary walking beam 32. The foremost axle 38 is similarly secured in a pair of saddle mounts 39 journaled on the front ends of the front secondary walking beams 25, while the third or intermediate axle 40 is also similarly secured in a pair of saddle mounts 41 which are journaled on the front ends of the rear secondary walking beam 32. Conventional rubber tired truck wheels C are journaled in a usual manner, one on each end of each of the axles.

A sliding hinge connection 42, having its hinge axis parallel to the axes of the pivot pins 28 and 33, is provided between the adjacent ends of each longitudinally aligned pair of secondary walking beams 25 and 32. This hinge connection 42 (FIGS. 6, 7, 8, 10 and 11) comprises a bracket 43 secured to the rear end of each front secondary walking beam 25, and has a pair of endwise extending ears 44 which embrace opposite sides of each intermediate axle mount 41. A through-bolt 45, best shown in FIG. 8, is fitted into a hole provided therefor diametrically of the rear secondary walking beam 32, and extends through a pair of circumferentially slotted openings 47 in the journal portion of the intermediate axle mount 41. Projecting ends of the hinge pin 41 are fitted into longitudinally slotted holes 48 provided therefor in the ears 44 of each hinge bracket 43. This hinged connection 42 permits limited rotative movement of the intermediate axle mount 41, and also permits sufficient longitudinal separation of the secondary walking beams 25 and 32 (see FIG. 10), to provide for maximum required walk of the three rear axles.

Considering the axes of the pivot pins 28 and 33 as fulcrums, the lever arm from the axis of the rear pin 33 to the axis of the rearmost axle 34 is one-half the length of the lever arm from the axis of this same rear pin 33 to the axis of the intermediate axle 40. Similarly, the length of the lever arm from the front pin 28 to the axis of the foremost axle 38 is approximately one-half that from the front pin 28 to the axis of the intermediate axle 40. Therefore, a load borne by the vehicle frame B and transmitted by the primary walking beam mounting pins 22 to the centers of the primary walking beams 21 will be transmitted thence via the primary and secondary walking beams to, and divided equally among, all three of the axles 34, 38 and 40. Any slight variation in lever-arm length caused by endwise separation of the secondary walking beams 25 and 32 in traversing extremely rough terrain, for example, as illustrated in FIG. 10, will be negligible.

A usual rubber-capped bottoming-pad 49 (FIGS. 6 and 7) is provided on the frame B directly above each of the three rear axles 34, 38 and 40, so that when an axle "bottoms" on the frame B, the axle will strike the pad and not the frame.

As shown in FIGS. 7-12 all of the three rear axles 34, 38 and 40 are dead, while in the vehicle A shown in FIGS. 1-6 all except the foremost axle 34 are live. The drive to the two rearmost axles 38 and 40 in the vehicle A of FIGS. 1-6 is by means of conventional, extensible drive shafts 50 and 51, each of which is provided with conventional universal joints 52. The foremost drive shaft 50 is driven by the output from a conventional gear box 53 mounted on the frame B, and is in driving relation with usual differential gearing, not shown, in the differential housing 54 (FIG. 6) of the axle 40. The drive shaft 51 provides driving interconnection between the differential gearing of the axles 38 and 40.

Usual gearing, not shown, within the gear box 53, is driven in a conventional manner by a drive shaft 55 (FIGS. 4, 5 and 6) from a usual transmission 57 (FIGS. 4 and 5) which in turn is driven by a suitable prime mover, such as a conventional internal combustion engine (not shown). Since the various drive shafts and gearing are of conventional and well-known types, and are not features of the present invention, the details thereof are not illustrated or described herein.

FRONT SUSPENSION

Referring now to the two-front-axle suspension, a front quad 60 comprises a trunnion block 61, which is trunnioned on a pair of coaxial primary trunnion pins 62 and 63 between the lower ends of a pair of pylon mounts 64 and 65 forming a pylon. The latter are secured transversely across the vehicle frame B, and extend downwardly therefrom. The common axis of the trunnion pins 62 and 63 extends longitudinally of, and midway between, the frame side members $B_1$ and $B_2$.

Secondary trunnion pins 67 and 68 are mounted coaxially in the trunnion block 61 with their common axis at right angles to the common axis of the trunnion pins 62 and 63. At least the left hand one 68 of the secondary trunnion pins is tubular, and a steering shaft 69 is journaled therein with its ends projecting therefrom (FIGS. 13-16).

A pair of walking beams 70 and 71 are trunnioned, respectively, medially of their respective lengths, on the secondary trunnion pins 67 and 68, and a pair of axles 72 and 73 are mounted transversely across the forward and rearward ends, respectively, of these walking beams.

Mounts 74, best shown in FIGS. 13-16, for the axles 72 and 73 each comprise a lower portion 75 which is journaled for relative rotative movement, one on each of the forward and rearward ends of each of the walking beams 70 and 71, and an upwardly extending annular portion 77 within which the associated axle is fixedly secured. Dirigible, rubber tired truck wheels 78 are mounted in a conventional manner, one on each end of each of the axles 72 and 73. Thus, the front quad 60 is mounted for universal pivotal movement about the intersection of the axes of the primary and secondary trunnion pins, and is retained against turning movement about a vertical axis through said intersection.

For steering the wheels 78, an inboard steering arm 79 is secured to the projecting inner end of the steering shaft 69 at substantially the center of pivotal movement of the trunnion block 61, and is free for required forward and rearward swinging movement about the axis of the steering shaft 69 to which it is secured. A hole 80 (FIGS. 14 and 16) in the trunnion block 61 provides clearance for the swinging movement of the inboard steering arm 79.

A drag link 81 (FIGS. 1, 3 and 6) interconnects the free upper end of the inboard steering arm 79 with the lower end of a lever 82, which is pivotally mounted on the frame B and is operatively interconnected by conventional means to a usual steering wheel 83 (FIGS. 4 and 5) at the driver's station 84 of the vehicle A. Such interconnection means may be either of the manual or power assisted type as desired in accordance with common practice.

An outboard steering arm 85 is secured to the projecting outboard end of the steering shaft 69 and is connected, by usual links 87 and 88, to steering arms 89 and 90, respectively, provided on the respective front and rear lefthand wheels of the quad 60.

Cross links 89' and 90' (FIG. 4) operatively interconnect for steering movement each of the left hand wheels 78 of the quad with its right hand counterpart, the various steering linkages being constructed and arranged to provide conventional Ackerman steering geometry so that during a steering maneuver all four wheels of the front quad 60 will maintain a position substantially perpendicular to radii from a common turn axis.

The live front axles 72 and 73 of the vehicle A shown in FIGS. 1-6, like the two rearmost ones 38 and 40 thereof described previously herein, are of a conventional type each having a central differential gear housing with conventional differential gearing, not shown, therein. An extensible drive shaft 89, best shown in FIG. 6, having usual universal joints 90, operatively interconnects the gearing of the gear box 53, referred to previously herein, to the differential gearing of the rearmost axle 73 of the quad 60, while another conventional drive shaft 91 operatively interconnects the differential gearing of the two front axles 72 and 73.

Torque arms 92 of a well-known type connect the various axles to the vehicle frame B to transmit driving and braking torque from the wheels to the frame.

OPERATION

In the operation of the vehicle A shown in FIGS. 1-6 of the drawings, it will be noted that all of the support wheels are capable of extremes of walk well beyond those of most prior vehicles of the same general classification, while the mounting of the quad for universal pivotal movement on the lower end of the pylon members 64 and 65 allows the quad 60 freedom for extremes of pitch and roll movement without twisting or rocking the vehicle frame B.

For example, in FIG. 1 the intermediate right hand wheel of the three rear wheels is in a depression, while the rearmost wheel is on a hump of ground. At the same time the four front wheels are on terrain which causes a twisting, upward pitch of the front quad, all within the limits of walk of the various axles, and without producing damaging stresses.

Figure 2:
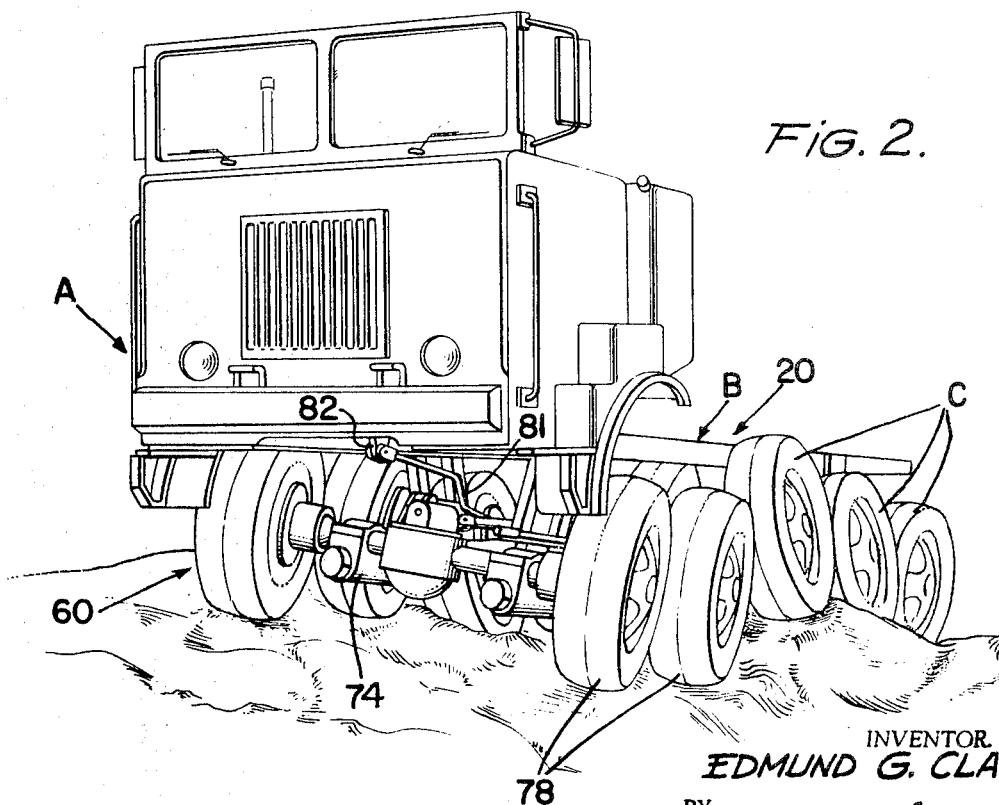
FIG. 2 is a perspective view of the front left quarter of the vehicle shown in FIG. 1.
Figure 3:
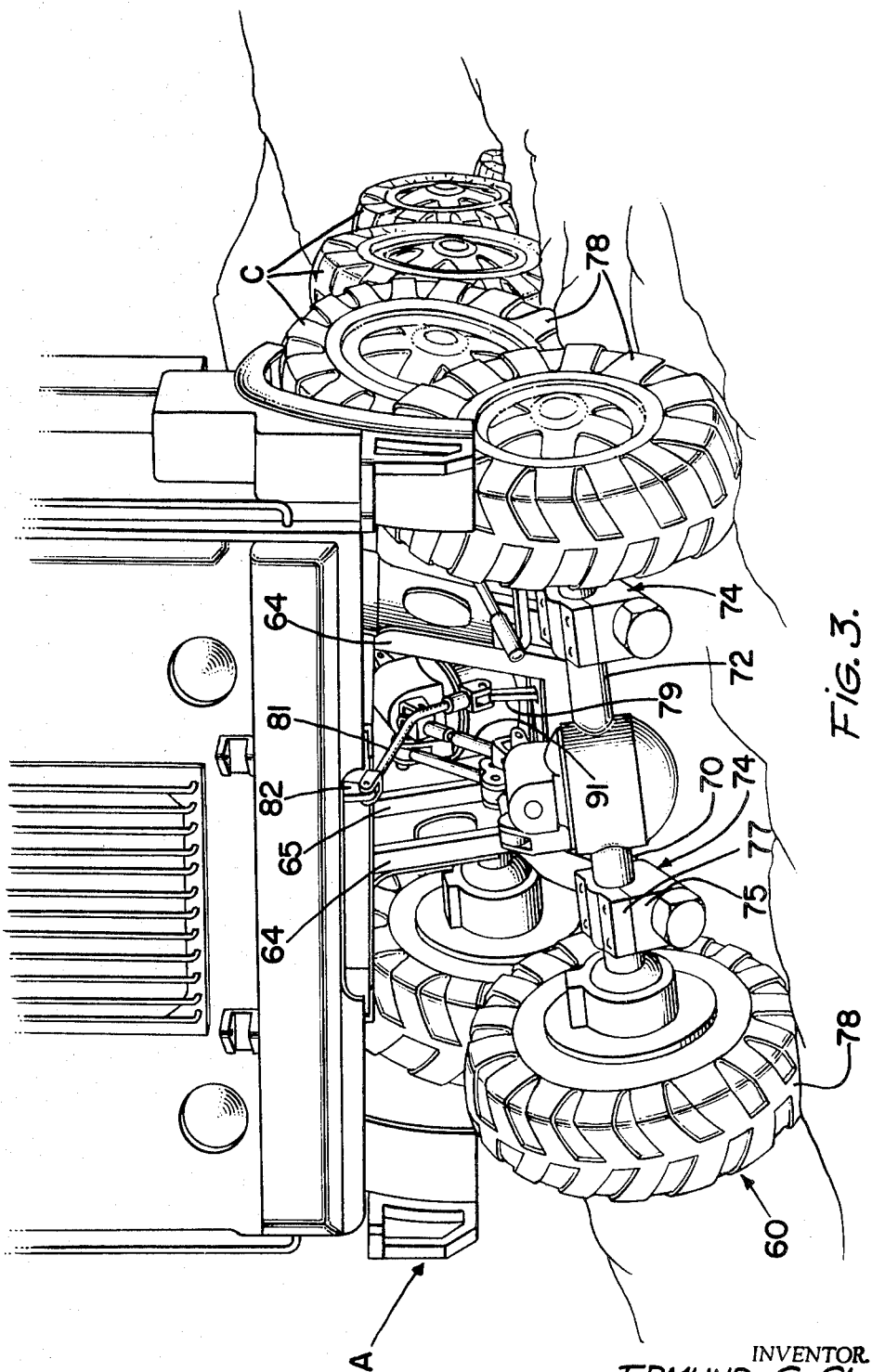
FIG. 3 is a fragmentary, enlarged, perspective view of the lower front end portion of the vhicle shown in FIGS. 1 and 2.
Figure 4:
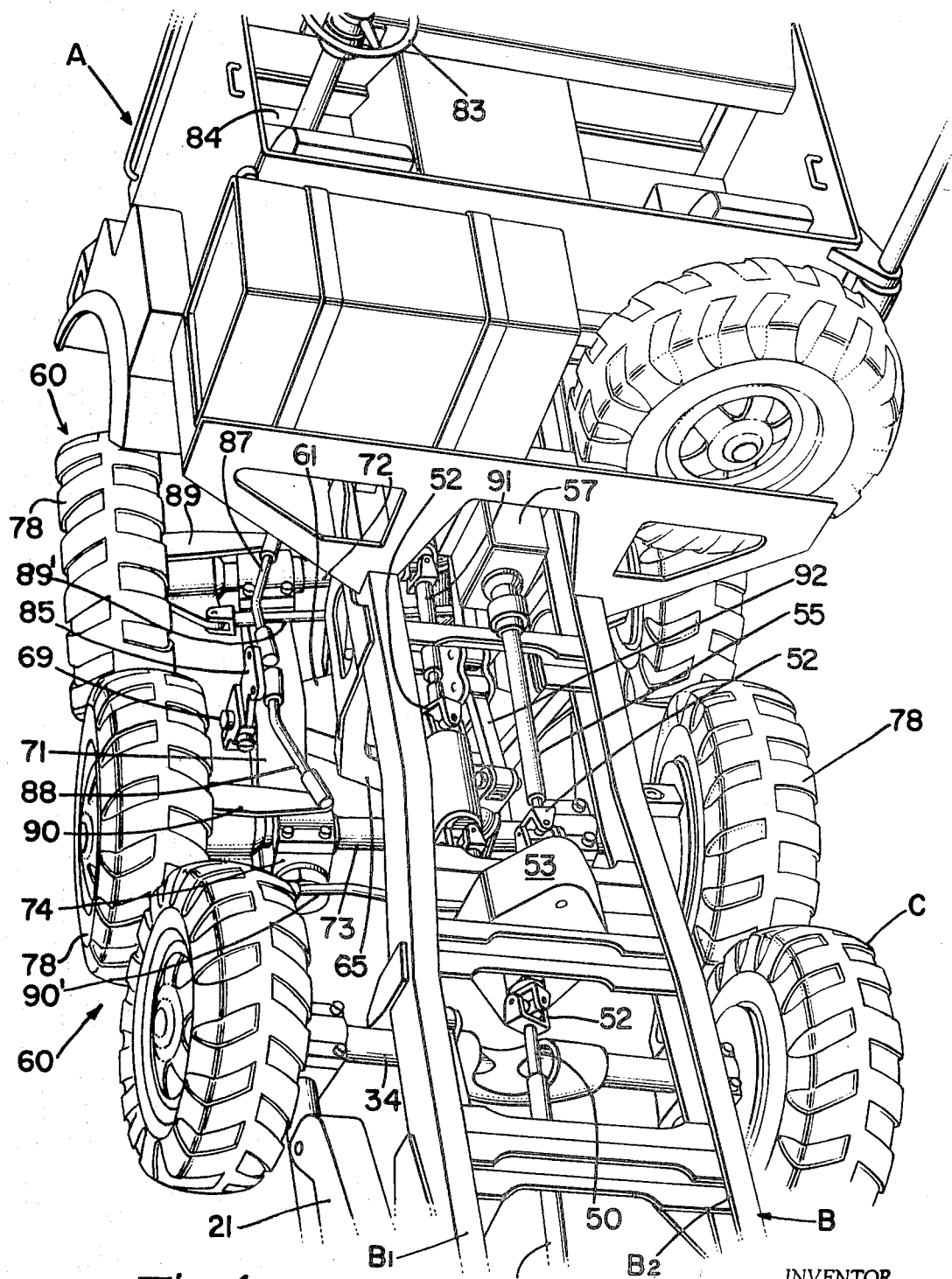
FIG. 4 is a fragmentary, perspective view of the forward portion of the same vehicle looking forwardly and downwardly from a point rearwardly of the driver's station.
Figure 5:
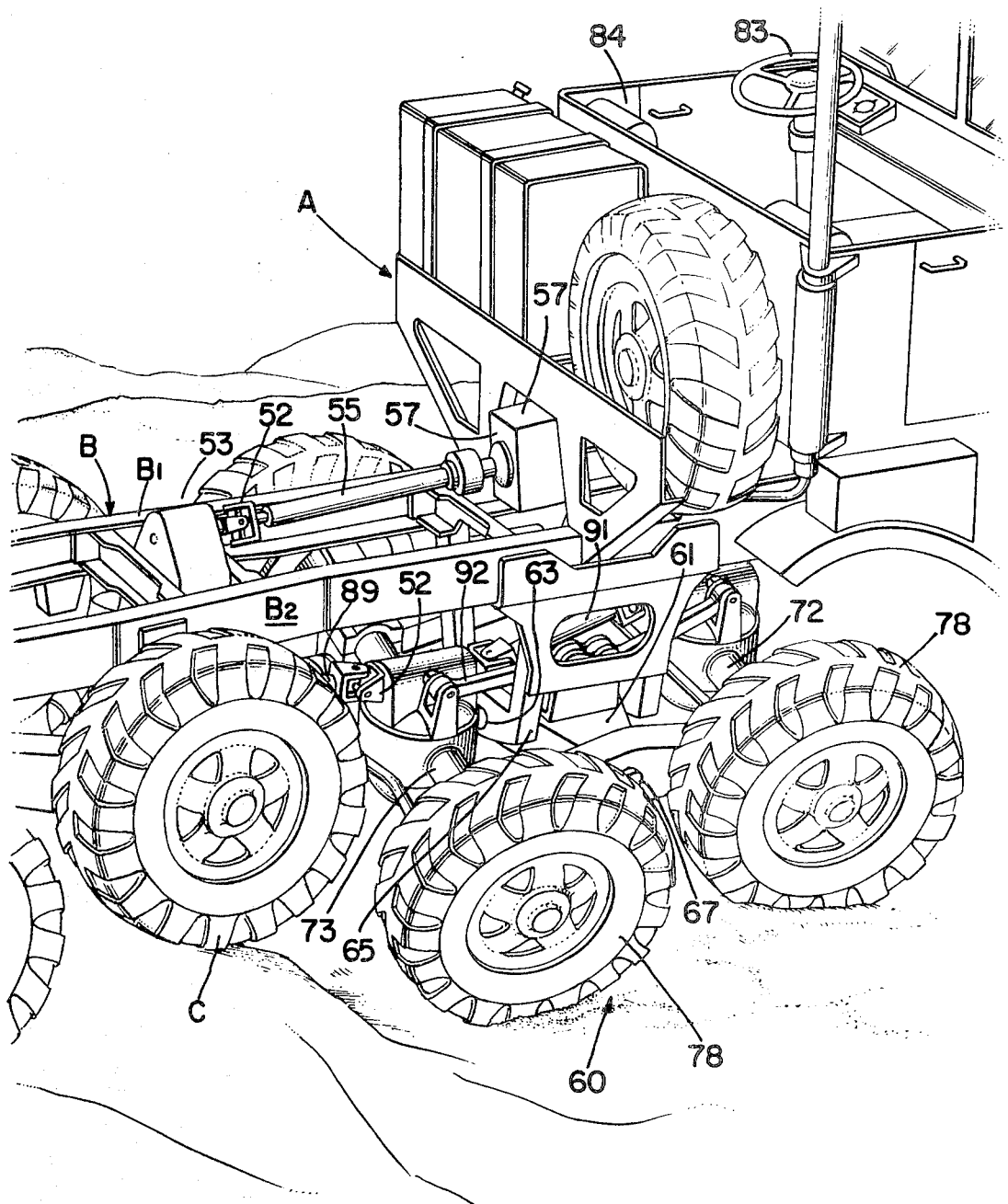
FIG. 5 is a fragmentary, perspective view of the same portion of the vehicle looking forwardly and downwardly from a point off to the right and rearwardly of the driver's station.

In FIG. 2 the front quad is on terrain which slopes to the left, whereby the trunnion block 61 swings downwardly on the left side and up on the right, while at the same time the left wheel of the foremost rear axle is raised high by a hump in the terrain. FIG. 5 shows the front quad rolled to the opposite side and both wheels on the foremost of the three rear axles elevated, while FIG. 3 shows the front quad in a severe angle of forward and downward pitch. During all such movements the various wheels walk freely and without strain, and at the same time provide a substantially equal distribution of load and of driving and braking torque.

During either forward or rearward pitch of the quad walking beams 70 and 71 about the common axis of their respective trunnion pins 67 and 68, no movement is induced thereby in the steering shaft 69 or the steering arms 79 and 85 secured thereto, since the steering shaft 69, as mentioned previously herein, is journaled co-axially in the tubular trunnion pin 68. Also, since the inboard steering arm 79 is at, or close to, the intersection of the trunnion axes of the trunnion block 61 and the walking beams 70 and 71, roll movement of the trunnion block produces no noticeable steering movement of the wheels.

While no drive is shown to the foremost one 34 of the three rear axles of the vehicle A in FIGS. 1-6, it will be obvious to any ordinarily skilled truck designer that such a drive can be provided by conventional design procedure.

However, the provision of a drive to this axle is not considered necessary in most instances and is omitted from the present disclosure since the drive mechanism is not, per se, a feature of the invention.

In all respects, except for its ability to carry heavy loads over extremely rough terrain while maintaining substantially equal loading on the wheels and avoiding damaging twisting stresses on the frame, the present vehicle operates in general like any good three-rear-axle-and-quad heavy duty truck, and can, therefore, be operated without additional instruction or training by any operator capable of handling this general type of equipment.

Substantially all of the parts shown in the drawings, except those specifically described herein, may be standard, off-the-shelf type truck parts, such standard parts comprising over seventy-five (75%) percent of the parts of the illustrative vehicle A shown in FIGS. 1-6. Such standard parts will be apparent in the drawings to any normally skilled designer, and the use of such standard parts greatly reduces the cost of building a vehicle such as that A shown in FIGS. 1-6.

It is well known that a three-rear-axle suspension for a heavy duty vehicle provides support of substantial transverse stiffness for the frame of the vehicle. Furthermore, when one of these three axles bottoms on one of the pads 49, further transverse relative tilting movement between such axle and the frame in that direction is prevented. Therefore, when such a vehicle is traversing rough ground, and is provided with a prior type of four-front-wheel suspension, such prior type of suspension does not have freedom for sufficient roll movement to prevent the imposing of severe and potentially damaging twisting and racking stresses on the vehicle frame. Also, many prior three-rear-axle suspensions are extremely limited in the amount of vertical displacement or walk which is permitted between the respective wheels on the same side of the vehicle while still maintaining adequate driving and load bearing contact with the terrain over which the vehicle is being driven.

The present invention not only allows a great deal of relative vertical displacement between the respective wheels thereof on the same side of the vehicle, but also provides freedom for a substantial amount of both pitch and roll movement of the front quad 60, all of which tend to maintain all of the wheels of all five axles in substantially full, equalized, load-bearing, driving and braking engagement with the terrain over which the vehicle is passing, even when such terrain is extremely rough as shown in FIGS. 1-6, 10 and 11 of the drawings.

While I have illustrated and described a preferred embodiment of the present invention, it will be understood, however, that various changes and modifications may be made in the details thereof without departing from the scope of the invention as set forth in the appended claims.

I claim:

1. A heavy-duty vehicle for traversing rough terrain, said vehicle having a frame and a steering wheel mounted on the frame,
   a rear suspension comprising a plurality of axles mounted on a rear portion of the frame,
   support wheels journaled one on each end of each axle of the rear suspension,
   a front suspension comprising a pylon extending downwardly from a front portion of the frame,
   axle support means mounted for universal pivotal pitch and roll movement about a pivotal center, and restrained against relative turning movement, on the lower end of the pylon,
   a pair of axles mounted transversely across the axle support means, one of the latter axles being mounted forwardly and one rearwardly of the center of pivotal movement of the axle support means on the pylon,
   dirigible support wheels mounted one on each end of each axle on the front suspension, and
   means operatively connecting the dirigible suport wheels to the steering wheel.

2. A heavy-duty vehicle as claimed in claim 1 wherein the means opeartively connecting the dirigible support wheels to the steering wheel comprises a steering shaft journaled for rotative movement on the axle support means and extending laterally of the vehicle frame from the center of universal pitch and roll movement of the axle support means, an inboard steering lever mounted on the steering shaft at substantially the center of pitch and roll movement of the axle support means, and operatively connected to the steering wheel, an outboard steering arm mounted on a laterally outward portion of the steering shaft, and a plurality of links and levers operatively connecting the outboard steering arm to the dirigible support wheels.

3. A heavy-duty vehicle as defined in claim 1 wherein the pylon comprises substantially upright means with lower end portions thereof spaced apart longitudinally of the vehicle, and the axle support means comprises a trunnion block trunnioned medially of its length for roll movement between the lower end portions of the upright pylon means, and a pair of walking beams trunnioned medially of their respective lengths for pitch movement about a common axis, one on each end of the trunnion block and extending longitudinally of the frame, the axles being mounted one across the forward ends and one across the rearward ends of the walking beams.

4. A heavy-duty vehicle as defined in claim 3 wherein the steering shaft is journaled for rotative steering movement co-axially with, and independent of, the walking beams.

5. A heavy-duty vehicle as defined in claim 3, wherein an axle mount is journaled for rotative movement about an axis extending longitudinally of the walking beam, one on each end of each of the walking beams, and the axles are secured to the axle mounts journaled on the respective ends of the walking beams across which the axles are mounted.

6. In a heavy-duty vehicle for traversing rough terrain, said vehicle having a frame and a rear suspension comprising a plurality of axles mounted on a rear portion of the frame and support wheels journaled on each end of each axle of the rear suspension,
   a front suspension system comprising, a pylon attached to and extending downwardly from a front portion of the frame,
   a trunnion member extending transversely of the vehicle frame pivotally mounted to the pylon for roll adjustment about an axis extending longitudinally parallel to the frame,
   a pair of walking beams, one one each end of said trunnion and pivotally secured thereto substantially medially of the walking beam so as to provide an independent pitch motion of each walking beam relative to the trunnion,
   and a pair of support wheels mounted on the end of each of said walking beams.

References Cited
UNITED STATES PATENTS 2,638,355    5/1953    Spangler _____ 280—81.5
3,002,762    10/1961    Scheel _____ 280—81.5

KENNETH H. BETTS, Primary Examiner